[11] 3,553,502

[72] Inventors Tatsuo Kasahara;
 Yoshiaki Kazawa; Isao Kurita; Eiichi
 Ishibashi; Hiroshi Hashimoto, Hitachi,
 Japan
[21] Appl. No. 731,772
[22] Filed May 24, 1968
[45] Patented Jan. 5, 1971
[73] Assignee Hitachi, Ltd.
 Tokyo-to, Japan

[54] GENERATOR DUCT FOR MAGNETOHYDRODYNAMIC GENERATORS
 12 Claims, 9 Drawing Figs.
[52] U.S. Cl. ........................................................ 310/11
[51] Int. Cl. ........................................................ H02n 4/02
[50] Field of Search ........................................... 310/11;
 174/9, 15, 31, 32, (Cursory)

[56] References Cited
 UNITED STATES PATENTS

| | | | |
|---|---|---|---|
| 3,259,767 | 7/1966 | Way et al. | 310/11 |
| 3,309,545 | 3/1967 | Emmerich | 310/11 |
| 3,356,870 | 12/1967 | Way | 310/11 |
| 3,358,163 | 12/1967 | Hofmann et al. | 310/11 |
| 3,219,852 | 11/1965 | Brill | 310/11 |
| 3,242,354 | 3/1966 | Novack et al. | 310/11 |

*Primary Examiner*—D. X. Sliney
*Attorney*—Craig, Antonelli, Stewart & Hill

ABSTRACT: A generator duct for a magnetohydrodynamic generator constituted of an electrically and thermally conductive cooling jacket and thin insulating layers formed thereon at the side of the path of the fluid flowing through the cooling jacket, and providing means for generating a layer of insulating fluid over the surface of the conductive cooling jacket which may be additionally coated with an insulating material.

GENERATOR DUCT FOR MAGNETOHYDRODYNAMIC GENERATORS

The present invention relates in general to electric current generators, and more particularly to a generator duct for a magnetohydrodynamic generator.

Generally, a magnetohydrodynamic generator, hereinafter referred to as an MHD generator, is a device which is capable of producing electrical power by transmission of an electrically conductive fluid through a generator duct under the influence of a magnetic field. By applying a magnetic field perpendicularly to the flow direction of a partly ionized, seeded gas having the property of a plasma, electrical energy can be taken from electrodes located perpendicularly to the magnetic field and the flow direction of the plasma. These electrodes are ordinarily arranged on the generating duct traversed by the plasma.

To increase the generating efficiency of an MHD generator, it is necessary to increase the conductivity of the fluid flowing in the generator duct. Such increase in the conductivity of the fluid is generally accomplished through increase in the temperature of the fluid. To this end, at present, a combustion gas whose temperature is nearly 3000° K., obtained by burning a fuel such as petroleum, propane gas, or the like in a combustion chamber, is used as the fluid for the generator.

As a result of the extremely high temperature of the fluid passing through the generator duct, this duct should be constructed so as to withstand the extremely high temperature for extended periods of time. To secure a high heat resistivity, one conventional generator duct is constructed so that the side thereof in contact with the high temperature fluid is formed by a thick insulating wall made of a refractory material, such as magnesium oxide, which insulating wall is externally covered by a metallic case or by a cooling jacket. However, in this known arrangement, it has been found that the thick wall made of refractory material tends to be damaged due to thermal impact or thermal internal stresses, and accordingly, the generator duct of this construction is not able to endure longrun operation. In addition, the generator duct of this known construction necessarily is of extremely large size, which introduces operational disadvantages which effect the obtainable power output from the generator.

The total power PT (W) generated by an MHD generator may be expressed as follows:

$$Pt = \lambda u^2 B^2 n (1-n) V$$

Where $\lambda$ is the electrical conductivity of the fluid in ohms per meter, $u$ is the velocity of the fluid in meters per second, B is the magnetic flux density in Webers per square meter, $n$ is the ratio of the output supplied to the load to the total output converted from the fluid, and V is the effective volume of the generator duct in cubic meters.

As indicated in the above equation, the generated power is proportional to the square of the magnetic flux density if the effective volume of the generator duct and the conductivity and velocity of the fluid are constant. Therefore, if the volume of the generator duct is increased, the magnetic resistance between the poles of the magnet will also increase, and as a result, the magnetic flux, and accordingly the magnetic flux density, will be reduced and the generator output will be correspondingly less. Thus, the increase in size which has been experienced in the aforementioned conventional generator duct provides a detrimental effect upon the power output attainable from the generator.

Another known generator construction provides a generator duct formed by a thick insulating wall of refractory material including a metallic member of double pipe construction buried therein to carry a cooling medium for cooling the insulating wall. However, in the generator construction wherein metallic members of double pipe construction are used in contact with the fluid, the metallic members must be electrically isolated from each other on the side of the path of the cooling medium, which in turn requires a very complicated construction. Thus, this known construction has also been found to be unsatisfactory.

It has been found experimentally that the wall of a generator duct made only of metallic material is not melted during longtime operation of the generator, even when the wall is in contact with a fluid of high speed and temperature, if means is provided for sufficiently cooling the wall during operation of the generator. If, on the other hand, the surface of the generator duct in contact with the fluid is made of electrically conductive material, short circuiting currents will flow between the electrodes and along the direction of the fluid flowing in the duct, tending to cause reduction in the output of the generator. Thus, the all metallic construction for the generator duct, in itself, does not solve all of the problems relating to efficient generator operation.

As is apparent, various materials and constructions for the generator duct have heretofore been put to test; however, presently, there is no duct of simple construction which can withstand the extremely high temperature of the fluid flowing therein over an extended period of time.

It is therefore an object of the present invention to provide a generator duct construction for MHD generators which avoids or altogether eliminates the difficulties inherent in known devices of a similar nature.

It is an object of the present invention to provide a generator duct for MHD generators in which the flow of short circuiting currents in the duct walls is prevented, and thus any decrease in the output of the generator due to such short circuit currents is avoided even if the generator duct is primarily formed of a cooling jacket made of metallic material.

It is a further object of the present invention to provide a generator duct for MHD generators having a construction which is extremely simple, and thus relatively economical to manufacture.

It is another object of the present invention to provide a generator duct for MHD generators in which the size of the generator duct is very small and the opposed magnetic poles of the generator may be disposed closely on the sides of the duct thereby improving the overall generator efficiency.

It is still another object of the present invention to provide a generator duct for MHD generator in which the electrical conductivity of the fluid flowing through the generator duct is increased to improve the generator efficiency.

It is still further object of the present invention to provide a generator duct for MHD generators which is primarily constituted of a cooling jacket made of metallic material, in which has a high heat resistivity and great mechanical strength, being capable of continuous operation for an extended period of time.

These and other objects, features and advantages of the present invention will become more apparent from the following detailed description thereof when taken in conjunction with the accompanying drawings, which illustrate several embodiments of the present invention, and wherein.

Figure 1:
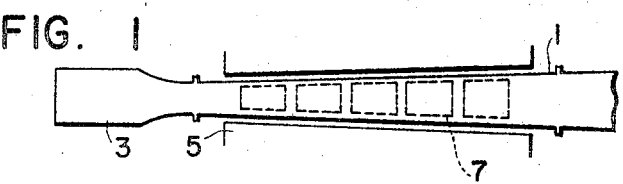
FIG. 1 is a schematic diagram of an MHD generator.

As schematically shown in FIG. 1, an MHD generator generally comprises a generator duct 1, a combustion chamber 3 connected to the generator duct 1 for providing a fluid to the generator duct, and a magnet 5 for providing a magnetic field to the fluid flowing through the generator duct. Inside the generator duct a plurality of electrodes 7 are disposed on either side of the fluid path in opposed relation, so as to provide means for deriving electrical output power from the generator.

Figure 2:
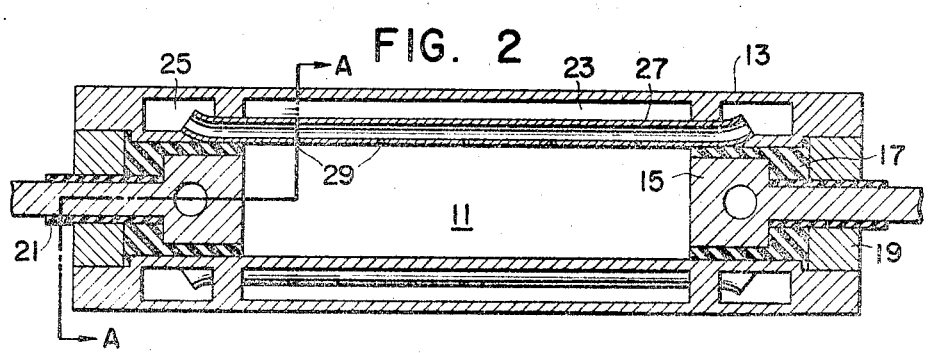
FIG. 2 is a cross-sectional view of a generator duct for MHD generators embodying the present invention.

FIG. 2 is a cross section view of the generator duct as seen in a plane perpendicular to the flow of the fluid. The fluid path 11, having a rectangular cross section, is formed by a pair of opposed metallic cooling jackets 13 and a plurality of electrodes 15 disposed respectively in opposed relationship in opposite walls forming the other side of the fluid path 11. An insulating material 17 having a heat resistant property, such as magnesium oxide, is interposed between the electrodes 15 and the cooling jackets 13 so as to electrically insulate the electrodes from each other and from the cooling jackets. While it is possible to eliminate the insulating material 17 and provide only suitable interspaces between the electrodes for purposes of providing electrical and thermal insulation of the electrodes, it should be noted that such interspaces may disturb the flow of the fluid in the duct and increase the pressure loss therein, and so the use of the insulating material 17 which provides for a smooth wall surface at the sides of the duct is preferable.

Figure 3:
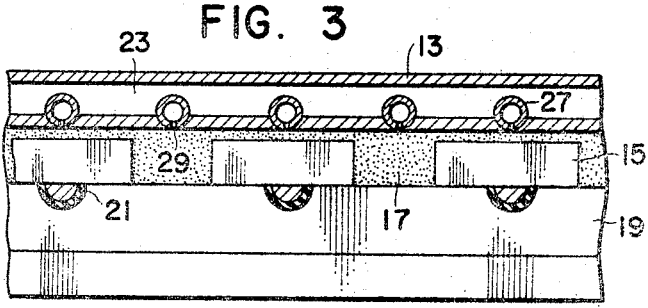
FIG. 3 is a sectional view taken along line A–A of FIG. 2.

The cooling jackets 13 are interconnected at the lateral edges thereof by metallic plates 19, which also insulatingly support the electrodes 15 in combination with insulating members 21 disposed about the lead through extensions of the electrodes. The cooling jackets 13 are constructed to provide, in addition to a cooling medium path 23, longitudinal conduits 25 for conducting electrically nonconductive gas along both sides of the cooling medium path 23. A plurality of gas supply pipes 27 are disposed between the conduits 25 in the cooling jacket and are soldered to the wall of the fluid side of the cooling jackets, as seen in FIG. 3, in such a way that the supply inlets 29 provided in the pipes communicate with the fluid path 11. The conduits 25 are connected to a gas producing device or storage arrangement from which an electrically nonconductive gas, such as air, nitrogen gas, or the like, is supplied to the conduits 25 for passage to the pipes 27. The electrically nonconductive gas is emitted from the pipes 27 through the inlets 29 to form a thin insulation film along the surface of the cooling jacket in the ducts.

In operation of the device of FIGS. 2 and 3, the electrically nonconductive gas is first introduced into the fluid path 11 from the pipe 27 through the supply inlets 29 so that a film of electrically nonconductive gas is formed on the inner surface of the cooling jacket 13. Subsequently thereto, an electrically conductive fluid of high temperature and high speed is introduced into the path 11 from the combustion chamber 3 in accordance with normal generator operation. Although the cooling jacket 13 is made of metal and forms the fluid path 11, the conductive fluid will not come into direct contact with the conductive walls of the duct because of the electrically nonconductive film formed in the vicinity of the surface of the jacket. Therefor, the possibility of generating short circuiting currents in the conductive walls of the duct formed by the cooling jackets is eliminated. In addition, since the cooling jackets 13 are sufficiently cooled by a cooling medium, the jacket will not be detrimentally affected by the high temperature of the conductive fluid. According to this construction, a generator duct for MHD generators is provided of extremely simple construction, capable of operation at a high efficiency for long periods of time without resulting damage thereto.

In the above mentioned embodiment, the amount of electrically nonconductive gas is preferably provided in a quantity equal to approximately 5 percent of the fluid flowing through the generator duct. If a quantity in excess of 10 percent is provided, the nonconductive gas film on the wall of the duct not only tends to separate from the surface of the duct so as no longer to act as an insulating film, but also the excessive quantity of nonconductive gas tends to lower the temperature of the fluid flowing into the duct thereby decreasing the generation efficiency of the generator.

Figure 4:
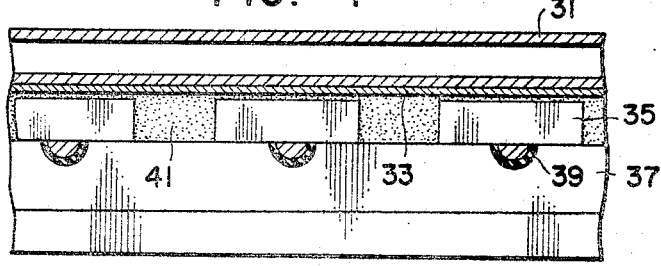
FIG. 4 is a sectional view of the generator duct in accordance with another embodiment of the present invention.

FIG. 4 illustrates another generator duct embodying the present invention in which the electrical insulation between the cooling jacket 31 and the fluid is provided in the form of a ceramic film or layer 33 secured to the surface of the cooling jacket so that a great degree of permanence is achieved by this construction. The remaining construction of this embodiment is similar to that provided in connection with FIG. 2, including electrodes 35, metallic plates 37 connecting the cooling jackets 31 to each other, insulating material 39 disposed about the electrodes 35 for insulating these electrodes from the metallic plate 37, and further insulating material 41 packed between the electrodes and the cooling jacket for insulating the conductive members from one another.

Figure 6:
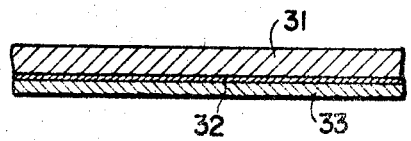
FIG. 6 is an enlarged sectional view of a portion of the wall of the generator duct.

As shown in FIG. 6, the ceramic film 33 is formed in such a manner that an intermediate layer 32 of approximately 0.1 mm. in thickness, which is made of Ni-Cr, is disposed on the surface of the cooling jacket 31, and the ceramic layer is formed of a thickness of approximately 0.3 mm. to 0.5 mm., by porcelain-enameling, weld-injection, vaporizing, chemical bonding, or the like. It is to be noted that if the thickness of the ceramic film is more than 1 mm., the ceramic film tends to be damaged due to thermal stress. The thickness of the ceramic film should be therefore kept within the limits of 1 mm. With this arrangement, the ceramic film is firmly bonded to the cooling jacket and therefore the ceramic film will not come off even if subjected to a fluid of high temperature and high speed, thereby providing effective means for eliminating the generation of short circuit currents in the generating duct. Further, since the thickness of the insulating film is very small, there is no fear of causing unbalance of internal stress due to heat, and the generator duct can therefore be made smaller than previously achievable.

Figure 5:
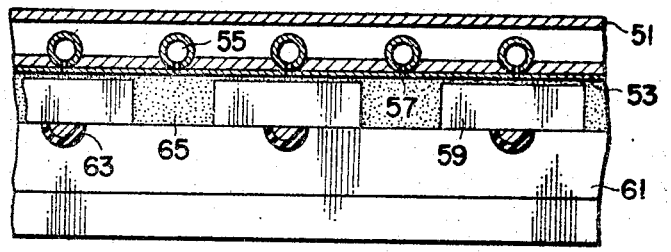
FIG. 5 is a sectional view of a generator duct corresponding to another embodiment of the present invention.

FIG. 5 shows another generator duct embodying the present invention, in which the electrical insulation between the cooling jacket 51 and the fluid is provided in the form of a ceramic film 53 in combination with an electrically nonconductive gaseous film provided from the pipes 55 and formed on the surface of the cooling jacket. The pipes 55 are provided with a plurality of gas supply inlets 57 for introducing the electrically nonconductive gas into the generator duct. Metallic plates 61 interconnect the cooling jackets 51 at the lateral edges thereof and insulating material 63 is provided for insulating the electrodes 59 from the metallic plates 61. Additional insulating material 65 packed between the electrodes and the cooling jacket serves to insulate these conductive elements from each other. In this construction, the wall of the duct formed by the cooling jackets is covered with a ceramic film 53, thereby eliminating occurrence of short circuiting even if a turbulent flow in the fluid results in a disturbance in the layer of electrically nonconductive gas, in which case the fluid would come into direct contact with conductive wall of the duct. In spite of such disturbances in the film of nonconductive gas, the ceramic layer 53 will insulate the conductive wall of the duct from the fluid. Thus, the generation voltage of the generator is stabilized under all operating conditions. Also, in the steady state the ceramic film is covered by the electrically nonconductive gas film and does not come into contact with the fluid. This serves to further reinforce the wall of the duct and to insulate the ceramic film from the high temperatures of the conductive fluid.

Figure 7:
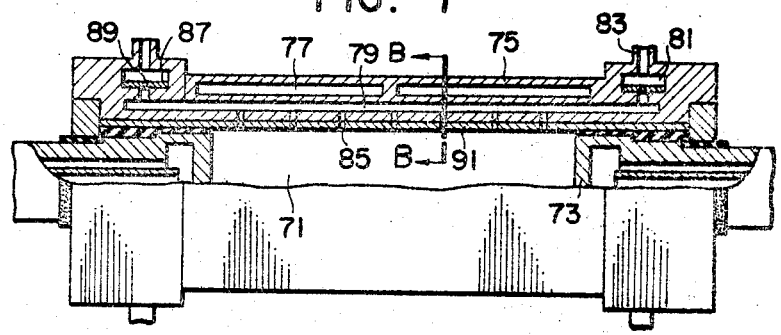
FIG. 7 is a partial sectional view showing another embodiment of the present invention.
Figure 8:
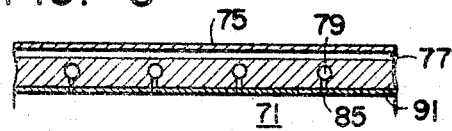
FIG. 8 is a partial sectional view taken along line B–B of FIG. 7.

FIGS. 7 and 8 illustrate another generator duct for MHD generators embodying the present invention. In this embodiment, the fluid path 71 is formed on the lateral sides by a plurality of electrodes 73 and is bounded at the upper and lower sides by cooling jackets 75 provided by cooling medium paths 77 formed therewithin. A channel 79 for transmitting electrically nonconductive gas is formed in the cooling jackets 75 on the side of the fluid path along the cooling medium path 77. A number of paths 79 are disposed therein perpendicular to the flow of the fluid in the duct. A path 81 is provided in communication with the path 79 and connects with a pipe 83 for supplying electrically nonconductive gas to the gas supply inlets 85 extending from the channels 79. These supply inlets 85 are disposed in a zigzag form in the direction of the flow of the fluid in the duct and the cross section of the inlets may be formed as a small circular or rectangular hole, or a slit. An adjusting plate 87 is located between the communicating path 81 and each of the channels 79 to adjust the amount of the flow of fluid to each channel 79. At the adjusting plate 87 is provided an adjusting hole 89 whose diameter is made smaller as it is moved further in the direction of flow of the fluid. The fluid resistance is small at the adjusting hole 89 of larger diameter, and accordingly, the pressure of the spouting gas supplied from the supply inlet 85 becomes large. While, on the other hand, the pressure of the gas at the inlet 85 communicating with the adjusting hole 89 of small diameter will be small.

The pressure of the fluid flowing in the duct is made somewhat lower as the fluid is more distant from the side of the combustion chamber because of friction at the wall of the duct and other reasons. By this construction, the difference between the pressure of gas and fluid from the supply inlet 85 may be made substantially constant at any point in the duct. Therefore, the quantity of the gas derived from each supply inlet 85 may be made uniform throughout the whole length of the duct. Thus, not only a lowering of the electrical conductivity of the fluid due to excess flow of gas, but also formation of the gas film apart from the duct wall, can be eliminated by this configuration, thereby improving the overall efficiency of the generator. A ceramic film 91 is formed on the surface of the fluid path 71 of the cooling jacket 75, with an intermediate layer of Ni-Cr formed therebetween, as shown in FIG. 6.

Figure 9:
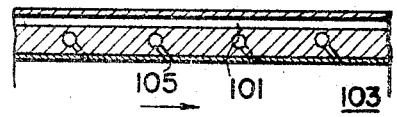
FIG. 9 is a partial sectional view of another embodiment of the present invention.

FIG. 9 provides another embodiment of the present invention in which the electrically nonconductive gas supply inlets 105 open in the direction of the fluid path 103 from a conduit 101, and the inlets 105 are tilted in the direction of the fluid flow, as indicated by the arrow in the FIG. The structure formed in this manner is effective in forming a gas film which remains closer to the wall of the duct.

According to the construction provided by the present invention, as set forth above, the thickness of the duct in the direction of magnetic flux can be reduced because the portion of the generator duct transverse to the direction of the magnetic flux is mainly formed by the cooling jackets without providing the usual thick layer of heat resistant material between the cooling jacket and the fluid in the duct. Due to the resultant reduction in the magnetic resistance, the generation efficiency can be increased.

From the practical point of view, the following characteristics of the invention are further effective in improving the generation efficiency of the generator. First, a metal possessing magnetic properties is employed for the material forming the cooling jacket. As to the magnetic material used, iron, nickel, cobalt and other alloys whose thermal conductivity is relatively high, are recommended. As previously discussed, the output of the generator is proportional to the square of the magnetic flux density, so that if the cooling jacket is made of magnetic material, the magnetic resistance can be reduced to a small value and the magnetic flux passing through the duct can be accordingly increased. Thus, the generation output of the generator is materially improved.

In addition, as is well known, it is effective for improving the output efficiency of the generator to increase the electrical conductivity of the fluid flowing through the generator duct. In the conventional methods for increasing the electrical conductivity of the fluid, an alkali metal such as cesium, potassium or sodium, which are rather easily electrolitically disassociated in the fluid, has been used as an additive thereto. This method, however, is not advantageous in view of the fact that the alkali metal is extremely expensive, and the resultant exhaust has, which may be extremely harmful, should be collected before it is dissipated into the atmosphere.

In contrast, according to the present invention, the ratio of the mixture of the fuel and the oxidizing agent, which are to be supplied to the combustion chamber, may be reduced to a value lower than the theoretical mixture ratio at which perfect combustion is realized, i.e., the amount of the oxidizing agent is reduced. As a result, an oxidizing agent such as air or poor oxygen is used as the electrically nonconductive gas for electrically insulating the cooling jacket from the fluid flowing in the duct, thereby promoting a more perfect combustion in the duct at the same time. During the combustion reaction, since a large volume of ionic electrons or the like is emitted all at once, the electrical conductivity of the combustion gas is made very high in comparison with that existing after the reaction. For example, when sodium chloride is added to the combustion flame, the electrical conductivity during the combustion reaction becomes approximately ten times as high as that provided after the reaction. When no sodium chloride is added thereto, the electrical conductivity during the reaction will be approximately 1000 times as high as that after the reaction.

In contrast, according to the present invention, the fuel is burned in the duct, thereby increasing the electrical conductivity and improving the generation efficiency of the generator. Thus, the output of the generator can be increased. Further, since the combustion is carried out by use of the gas which serves to electrically insulate the cooling jacket from the fluid, the fuel can be uniformly burned in the duct without separately providing a supply of oxidizing agents. Still further, in spite of the fact that the electrically nonconductive gas, when supplied into the duct from the supply inlet at a low temperature will be heated by contact with the fluid and will also serve as an oxidizing agent for the fluid, it will neither lose its inherent insulating property nor unduly lower the combustion temperature of the fluid. Since the fuel is not perfectly burned in the combustion chamber, the combustion chamber can be used at a lower temperature than previously, and the size of the combustion chamber can be reduced.

An experimental MHD generator built in accordance with the configuration illustrated in FIGS. 7 and 8 has the following specific characteristics:

Effective length of the generator duct—600 mm.
Width of the generator duct in the magnetic flux direction—30 mm.
Distance between the opposed electrodes on the sides of the generator duct—120 mm.
Number of electrodes—12 pairs.
Material of cooling jacket—Copper.
Fluid—Petroleum combustion gas.
Seed material—KOH aqueous solution.
Average temperature of the fluid—Approximately 2,800° K.
Average velocity of flow of the fluid—800 m./sec.
Magnetic flux density crossing the fluid—1.9 wb./m².
Flow of the fluid—500 g./sec.
Quantity of the electrically non-conductive gas—Approximately 25 g./sec.
Thickness of the ceramic film—0.5 mm.
    Thickness of the intermediate layer—0.1 mm.
    Thickness of the ceramic layer—0.4 mm.
Output—2.5 to 3 kw.
Operating time—120 hours.

No damage was observed on the wall of the duct after 120 hours of operation of this embodiment, and it was observed that the generator could be further operated continuously.

As the invention has been explained in detail with reference to specific embodiments, it will be appreciated that according to this invention, a generator duct for MHD generators, which can be operated at a high generation efficiency and for a long period of time can be obtained in spite of its simple configuration.

We claim:

1. A generator duct for magnetohydrodynamic generators having a high temperature electrically conductive fluid flowing at a high velocity within the duct comprising:
    a pair of opposed metallic wall members forming opposite sides of a fluid path;
    a plurality of electrodes disposed on the opposite sides of said fluid path between said wall members thereby enclosing said fluid path, said electrodes being electrically insulated from each other and from said wall members;

cooling means disposed within said wall members for cooling the surface thereof adjacent to said fluid; and dielectric thin films formed on the surfaces of said metallic wall members and having a thickness smaller than a millimeter.

2. A generator duct as defined in claim 1 wherein said metallic wall members are formed of magnetic material.

3. A generator duct as defined in claim 1 wherein the surface of said metallic wall members have a nickel-chromium film on the side adjacent said fluid path and a thin ceramic film on the surface thereof, said ceramic film being exposed to said fluid path.

4. A generator duct for magnetohydrodynamic generators having a high temperature electrically conductive fluid flowing at a high velocity therein comprising:

a pair of opposed continuous metallic wall members forming opposite sides of a fluid path;

a plurality of electrodes disposed on the opposite sides of said fluid path, said electrodes being electrically insulated from each other and from said wall members;

cooling means disposed within said wall members for cooling the surface thereof adjacent to the fluid; and means for introducing an electrically nonconductive gas into said fluid path to form thin films adjacent to the surface of said metallic wall members thereby to electrically insulate the metallic walls from the conductive fluid.

5. A generator duct as defined in claim 4 wherein said electrically nonconductive gas contains an oxidizing agent for effecting combustion reaction in the duct.

6. A generator duct as defined in claim 4 further including gas introducing means which include a plurality of electrically nonconductive gas supply elements connected to gas supply means for providing a supply of electrically nonconductive gas, said gas supply elements having a plurality of gas outlets communicating with said fluid path, whereby thin films of said electrically nonconductive gas are formed on the surfaces of said metallic wall members.

7. A generator duct as defined in claim 6 wherein said gas supply means is connected to said gas supply elements by means of gas supply paths formed in said metallic wall members.

8. A generator duct as defined in claim 7 wherein said gas outlets are directed in the direction of flow of conductive fluid along said fluid path.

9. A generator duct as defined in claim 7 wherein adjusting means is disposed in said gas supply paths for regulating the amount of nonconductive gas supplied to said fluid path in inverse proportion to the distance between the gas outlet supplying said gas and the gas entrance of said duct.

10. A generator duct for magnetohydrodynamic generators having an electrically conductive fluid at a high temperature and flowing at a high velocity therein comprising:

a pair of opposed metallic wall members forming opposite sides of a fluid path;

a plurality of electrodes disposed on the opposite sides of said fluid path, said opposite sides being adjacent to said wall members, said electrodes being electrically insulated from each other and from said wall members;

cooling means disposed within said wall members for cooling the surface thereof adjacent to said fluid; and thin ceramic films formed on the surfaces of said metallic wall members adjacent to said fluid path and having a thickness smaller than a millimeter.

11. A generator duct for magnetohydrodynamic generators having an electrically conductive fluid at a high temperature and flowing at a high velocity therein comprising:

a pair of opposed metallic wall members forming opposite sides of a fluid path;

a plurality of electrodes disposed on opposite sides of said fluid path between said wall members, thereby enclosing said fluid path, said electrodes being electrically insulated from each other and from said wall members;

cooling means disposed within said wall members for cooling the surface thereof adjacent said fluid;

thin ceramic films formed on the surfaces of the sides of said metallic wall members adjacent said fluid path and having a thickness smaller than a millimeter; and means for introducing an electrically nonconductive gas into said fluid path to form a thin film on the surface of said thin ceramic films adjacent said fluid.

12. A generator duct as defined in claim 11, wherein said electrically nonconductive gas contains an oxidizing agent for effecting combustion reaction in the duct.